United States Patent [19]
Dimitri et al.

[11] 3,929,453
[45] Dec. 30, 1975

[54] COMPOSITES OF LIGNIN AND BIOLOGICALLY ACTIVE MATERIALS

[75] Inventors: Mitchell S. Dimitri, Charleston; Sten I. Falkehag, Mount Pleasant, both of S.C.

[73] Assignee: Westvaco Corporation, New York, N.Y.

[22] Filed: Sept. 27, 1973

[21] Appl. No.: 401,375

[52] U.S. Cl. .................. 71/101; 71/65; 71/79; 71/100; 71/118; 71/122; 71/123; 71/126; 71/DIG. 1; 424/161; 424/200; 424/205; 424/210; 424/215; 424/219; 424/225; 424/248; 424/267; 424/286; 424/300; 424/350; 424/362
[51] Int. Cl.$^2$............................... A01N 9/12
[58] Field of Search............. 71/101, 79, DIG. 1; 424/362

[56] References Cited
UNITED STATES PATENTS

| | | | |
|---|---|---|---|
| 2,725,336 | 11/1955 | Sumner et al. | 424/362 |
| 2,919,182 | 12/1959 | Harman et al. | 71/101 |
| 3,052,598 | 9/1962 | Racusen | 424/362 |
| 3,172,752 | 3/1965 | Pierce | 71/DIG. 1 |
| 3,212,967 | 10/1965 | McFadden et al. | 71/DIG. 1 |
| 3,336,129 | 8/1967 | Herrett et al. | 71/101 |
| 3,470,148 | 9/1969 | Allan | 71/DIG. 1 |
| 3,632,739 | 1/1972 | Kornblum | 424/362 |
| 3,726,850 | 4/1973 | Detroit | 71/DIG. 1 |
| 3,813,236 | 5/1974 | Allan | 71/DIG. 1 |
| 3,820,976 | 6/1974 | Wells et al. | 71/101 |

FOREIGN PATENTS OR APPLICATIONS

| | | | |
|---|---|---|---|
| 690,361 | 7/1964 | Canada | 71/DIG. 1 |
| 982,344 | 2/1965 | United Kingdom | 71/DIG. 1 |

*Primary Examiner*—Glennon H. Hollrah
*Attorney, Agent, or Firm*—Richard L. Schmalz; Ernest B. Lipscomb, III

[57] ABSTRACT

The subject invention is directed to composites of lignin and biologically active materials. The composites consist of a biologically active agent dispersed throughout an alkali lignin material in a ratio of .1:1 to 1:10 of the biologically active agent to alkali lignin. The biologically active agent is either entrapped by the lignin macromolecular matrix or held by physical-chemical forces of van der Waal's, hydrogen bonding or ion association types. The active agent is slowly released on application either by diffusion through the lignin solid, or through degradation or dissolution of the lignin. The composites are obtained by a variety of processes including the coprecipitation-inclusion from an aqueous alkaline lignin solution by adding acid or salts, the drying of a precipitated lignin slurry biologically active agent dispersion, or the eliminaton of a common solvent from a lignin-biologically active organic agent mixture. The biologically active agent may be incorporated in the lignin matrix at dimensions varying from molecular size to droplet or particle sizes.

2 Claims, No Drawings

COMPOSITES OF LIGNIN AND BIOLOGICALLY ACTIVE MATERIALS

BACKGROUND OF THE INVENTION

1. Field of the Invention

This invention relates to lignin/biologically active agent composites. More particularly, this invention relates to the inclusion of a biologically active agent in molecular to droplet or particle size throughout an alkali lignin matrix and the slow release of the biologically active agent from the matrix.

2. Prior Art

Methods of obtaining controlled release of biologically active organic liquids such as drugs and pesticides are numerous in the prior art. For example, one method for obtaining control release of droplet size materials is through microencapsulation, such as that set forth in U.S. Pat. No. 3,516,941 to G. W. Matson. In the Matson patent microcapsules are provided whereby a liquid organic fill is enclosed by a strong, impermeable polymer shell. The microcapsules are produced by dispersing and maintaining the fill material as finally divided particles in an aqueous water-soluble urea-formaldehyde precondensate while polymerizing the precondensate by acid catalyst. In this case, the fill material is released by rupturing the encapsulating material.

Other prior art control release mechanisms have been utilized to control biologically active organic liquids. As presently known, pesticides often have short useful lives because they are degraded by bacterial inactive metabolites, or washed by rain into the subsoil where they are inaccessible to the pest they intend to control, or rendered inactive by volatile loss, or by ultraviolet degradation of sunlight. It is therefore desirable to provide a system whereby proper amounts of a biologically active organic liquid, such as a pesticide, may be continually released over a relatively long period of time. An up-to-date discussion of controlled release of pesticides and the desirability of using controlled release systems was presented by Allan et al. in an article entitled "Pesticides, Pollution and Polymers" in the March 1973 issue of Chem Tech.

U.S. Pat. No. 3,393,990 to R. J. Geary is directed to a stabilized pesticide composition wherein the pesticide is ground to a fine state of subdivision to exhibit its greatest effectiveness due to maximum availability by virtue of large surface area. The pesticide is held in place with a stabilized interpolymer substrate while it is slowly released.

U.S. Pat. No. 3,172,752 to H. L. Pierce is directed to an article of manufacture for control release of an active agricultural substance. The article is an enlarged particle formed from ground, expanded perlite which is properly sized and heated to drive off water. The expanded perlite particles are coated and impregnated with hardened, slowly soluble holding material of a viscous character before hardening. At least one active agricultural substance is uniformly dispersed therethrough and held to the particle substantially and completely covering the surfaces and completely filling the pores which communicate with the surfaces to intimately and tightly bond the agricultural substance to the perlite particles.

A third method for controlling the release of pesticides is provided in Canadian Pat. No. 863,310 to G. G. Allan. There is disclosed in the Allan patent the chemical co-valent bonding of a pesticide to a lignin polymeric substrate. The pesticide is released by destruction of covalent chemical bonds.

It is therefore the general object of this invention to provide a composite having a biologically active agent interspersed throughout an alkali lignin matrix.

Another object of this invention is to provide processes for interspersing a biologically active agent throughout an alkali lignin matrix via physical contact forming a composite.

It is a specific object of this invention to provide a controlled release pesticide system comprising as a composite, a pesticide interspersed throughout an alkali lignin matrix whereby the release rate of the pesticide is accomplished through diffusion of the active ingredient through the alkali lignin matrix or through degradation or dissolution of the alkali lignin matrix or a combination of both.

It is still another object of this invention to provide lignin composites containing pesticides which are stabilized against the degradation effects of ultraviolet light in the form of sunlight.

It is an even further object of this invention to provide pesticidal containing composites which have control release that are substantially uneffected by rain.

It is yet another object of this invention to provide lignin matrixes containing pesticides which resist and inhibit the action of micro-organisms.

Still another object of this invention is to provide controlled release pesticidal systems which maintain maximum and effective activity over prolonged periods of time under normal plant environmental conditions.

Other objects, features and advantages of this invention will become evident on reading the foregoing detailed description.

DETAILED DESCRIPTION OF THE INVENTION

It has been found that a biologically active agent, usually an organic liquid, can be incorporated into an alkali lignin matrix or associated with the lignin at any point during the association-precipitation-coagulation-flocculation-coalescence process. The degree of intermixing of the two components or dispersion of the active agent in the lignin will depend in part upon the particular process used and also the contact and strength or tendency of interaction with the lignin to form a physical-chemical bond.

For the purpose of this invention the term "composite" is intended to mean a lignin matrix forming a physical-chemical bond with a biologically active agent interspersed throughout said lignin matrix. The term "alkali lignin matrix" is meant to include lignin solids larger than molecular size above at least 100A, and preferably above 5000A, but not forming a polymer. The biologically active agent may be incorporated into the lignin matrix at dimensions varying from molecular size to droplet size, i.e., 0.5–1.5 $\mu$. As stated, the composites comprise a biologically active agent interspersed throughout an alkali lignin matrix at a weight ratio of 0.1:1 to 10:1 active agent to alkali lignin, preferably a weight ratio of 1:1 to 1:4 of active agent to alkali lignin.

Any of the alkali lignins may be employed to make the composites of this invention. The lignins are all derived by an alkaline digestion of lignocellulose material. Most commonly they are obtained as by-products from alkaline processes of papermaking where sodium hydroxide alone or in combination with sodium sulfide is employed. These lignins are generally referred to as soda and kraft or sulfate lignins after the pulping process used. Such alkali lignin starting material is employed in the salt form, i.e., where the sodium or potassium cation has replaced the hydrogen, so it will be water-soluble. Additionally other water-solubilizing salt-forming cations may be used, such as ammonia. In the preferred practice of this invention, the alkali lignin employed is a kraft pine lignin.

The biologically active agents contemplated for use for the present invention and interspersed throughout the alkali lignin matrix are preferably those agents which are normally liquid and water-insoluble at room temperature or at a slightly raised temperature, i.e., 120°F., but can also be solids. Because of the degradation of physical characteristic of the acidified lignin allowing diffusion, these biologically active organic liquids are intended to include drugs for both humans and animals, materials for metabolism control and pesticides. The biologically active agent is either entrapped by the lignin macromolecular matrix or held by physical-chemical forces of van der Waal's, hydrogen bonding or ion association.

Particular pesticides include, insecticides, fungicides, nematocides, herbicides and the like. The pesticides used are those which can be interspersed and, if desired, dried with alkali lignin to form the physical-chemical bond therebetween.

Among the pesticides which are herein contemplated and are set forth include the following types, alcohols, chlorinated hydrocarbons, organophosphates, carbamates, substituted ureas and substituted phenolics. Specific examples of pesticides may include, and are set forth as exemplary only.

| Tradename | Chemical Name | Use |
|---|---|---|
| Abate | O,O,O',O'-tetramethyl O,O'-thiodi-p-phenylene phosphorothioate | Insecticide |
| Alfol | N-decanol | Plant regulator |
| Aqualin | 2-propenal | Herbicide |
| Avadex | S-2, 3-dichloroallyl diisopropylthio-carbamate | Herbicide |
| Calixin | N-tridecyl-2,6-dimethyl morpholine | Fungicide |
| — | carbon disulfide | Insecticide |
| CGA | O-(methyl-2-propinyl-amino) phenyl N-methyl-carbamate | Insecticide |
| Chlordane | — | Insecticide |
| Cyanox | O-p-cyanophenyl O,O-dimethyl phosphorothioate | Insecticide |
| — | 2,2-dichlorovinyl dimethyl phosphate | Insecticide |
| Dinoseb | 2(sec-butyl)-4,6-dinitrophenol | Herbicide |
| Dursban | O,O-diethyl O-(3,5,6 trichloro-(2 pyridyl) phosphorothioate [m.p. 106–109°F.] | Insecticide |
| EDB | 1,2-Dibromoethane | Insecticide |
| Eptam | S-ethyl dipropylthio-carbamate | Herbicide |
| Lasso | 2-chloro-2', 6'-diethyl-N-(methoxymethyl) acetanilide | Herbicide |
| Parathion | O,O-Diethyl O-p-nitrophenyl phosphorothioate | Insecticide |
| Piperalin | 3-(2-Methylpiperidino) propyl 3,4-dichlorobenzoate | Fungicide |
| TCBC | Trichlorobenzylchloride | Herbicide |
| Trithion | S-[[(p-chlorophenyl) thio]methyl] O,O-diethyl phosphorodithioate | Insecticide |
| Vegadex | 2-chloroallyl diethyldithiocarbamate | Herbicide |

The specific composite obtained will be determined by the properties of the biologically active agent and the alkali lignin product. The end result, however, is a physical-chemical combination of the active agent and the alkali lignin matrix forming a composite such that, upon diffusion or through degradation or dissolution of the lignin, the active agent, i.e., pesticide, is released to the soil, or to the plant or other system on which it is being placed.

The mode of bringing the alkali lignin in solid form (matrix) together with the biologically active organic liquid can be accomplished through a number of processes which include, for example, (1) the coprecipitation-inclusion from an alkaline aqueous solution by acidification or salt addition and subsequent drying, (2) the elimination of a common solvent from a lignin organic liquid mixture, (3) the mechanical-thermal mixing of large surface are alkali lignin and organic liquid by heating and pressing [tableting] a mixture of the two materials, (4) the mixed precipitation from an alkali lignin/active agent mixture by addition of a non-solvent to a solution of the mixture, and (5) the heat coalescence of precipitated lignin in the presence of the biologically active agent.

A preferred process of the obtaining the composites of this invention is through the coprecipitation-inclusion route. In this preferred process a determined amount of salt of alkali lignin in an aqueous solution, preferably as the form of a sodium or ammonium salt, is intermixed with the active agent. The alkali lignin solution and active agent are thoroughly mixed under conditions of high shear mixing to form a stable emulsion. Mixing is usually carried out at room temperature but, in any event, if heating is used the temperature is kept below the point at which the lignin undergoes major chemical changes. The emulsion is then acidified using a mineral acid, such as sulfuric acid, to a pH between about 2 and about 6, preferably a pH of 4 to 5 to precipitate the active agent lignin emulsion with the active agent being physically absorbed within the lignin to form the macrodispersion. The precipitated materials, if desired, may be dried by any number of methods. Spray drying is one preferred method. Another method of processing is to contact the precipitated dispersion with steam to heat the precipitated lignin containing the pesticide; thereafter filtering and washing the resultant material. The active agent can also be dispersed within the precipitated lignin slurry and subsequently the mixture dried.

A second preferred process for making the composites of this invention include the elimination of a common solvent from a lignin/active agent mixture. An aqueous alkali lignin solution is dissolved in a solvent, such as acetone, and the active agent mixed in. Upon solvent removal lignin/active agent separates and can be further processed to suitable form. The solvent system can be a mixture, such as acetone and water.

It should be noted that none of the problems connected with using a catalyst are present when forming the controlled release composites of the subject invention. One of the key reasons why the composites form a successful pesticide controlled release system is that the rate of release can be controlled by the ratio of pesticide to lignin matrix and by the particular lignin matrix used. The weight ratio of pesticide to lignin may be from about 0.1:1 up to 10:1 by weight, preferably 0.25:1 to 1:1. Accordingly, the amount of pesticide interspersed within the lignin matrix will, in part, dictate the time which it will take to clear the intersis of the lignin to attain the release of the active compound. The particular material selected will have a bearing on the release mechanism by virtue of its chemical structure. Therefore, the amount of pesticide that can be released over a given period of time can be controlled by selecting the lignin matrix and a choice of type of physical-chemical bond used to achieve its combination with pesticide.

Further advantages of pesticide systems of this invention are, reduced toxicity to humans, controlled continuous release of the active component, the lower risk of over-application which may damage the plants, and fewer and more efficient application to the ultimate user.

The practice of this invention may be clearly seen from the foregoing examples.

EXAMPLE 1

Several slow release composites were prepared by mixing a sodium lignate (kraft lignin solution) with the liquid herbicide -- 2-chloroallyl diethyl-dithiocarbamate (Vegadex). The Vegadex-lignin emulsions were mixed under high shear in an L-1 Eppenbach Homomixer operating at 8000 r.p.m. After mixing, a dilute sulfuric acid solution (0.1N) was added to lower the pH to 4.5–5.5 and precipitate the emulsion.

The Vegadex/lignin composites were applied to freshly disced plots in December. The composites were applied via a knapsack sprayer utilizing 25 gallons of water per acre, No. 8003 nozzles, and 30 psi. At the time of application the sky was clear, wind at 3 mph, soil moisture at field capacity, air temperature 75°F., and soil temperature 55°F. The plots were 1/300 acre and were replicated in a randomized block design. Weeds present were crabgrass, chickweed, corn spurry, and evening primrose.

The effect of herbicide/lignin composites on the control of weeds over an extended time interval are shown in the table below.

| Sample | Vegadex/ Lignin Content | Slurry pH | Weed Control[a], Days After Application | | |
|---|---|---|---|---|---|
| | | | 35 | 65 | 95 |
| Control | None | None | 3.0 | 3.7 | 3.7 |
| Vegadex (4 lbs/acre) | None | 7.3 | 0.5 | 1.3 | 2.0 |
| Vegadex/lignin | 1:1 | 5.3 | 2.0 | 2.6 | 3.7 |
| Vegadex/lignin | 1:2 | 4.6. | 0.7 | 0.7 | 1.2 |
| Vegadex/lignin | 1:3 | 5.3 | 0.7 | 0.7 | 1.7 |

Notes: [a]Weed control - 0 (complete control); -5 (no control)

As shown in the table, several treatments were equal to Vegadex alone in controlling weeds after 35 days. By 65 days after application, the Vegadex alone was starting to fade, but Vegadex/lignin (1:2, pH 4.6) and Vegadex/lignin (1:3, pH 5.3) were still holding firm. After 95 days, Vegadex alone was rapidly becoming useless, but Vegadex/lignin 1:2, pH 4.6 still was doing an adequate job of controlling weeds.

EXAMPLE 2

A composite of lignin and the insecticide Dursban was made to demonstrate composites made by the elimination of a solvent route. Twenty grams of alkali lignin (Indulin AT) was partly dissolved in 25 ml. of acetone at room temperature. To this viscous solution was added 10 grams of Dursban. Upon standing for 5 minutes a liquid layer separated and was drawn off. The layer containing the lignin and Dursban was dried first overnite at room temperature and then in an oven at 40°C. The result was a lignin matrix containing the insecticide interspersed throughout.

EXAMPLE 3

Eighty grams alkali lignin (Indulin AT) and 40 grams Dursban were dissolved in 250 ml. of an acetone-water (9:1) mixture. The solvent was removed in vacuum system at room temperature and subsequently freeze dried to give a powder.

While the invention has been described and illustrated herein by references to various specific materials, procedures and examples it is understood that the invention is not restricted to the particular material combinations of material, and procedures selected for that purpose. Numerous variations of such details can be implied as will be appreciated by those skilled in the art.

What is claimed is:

1. A process for making a controlled release herbicide containing composite which consists essentially of;
    a. emulsifying an aqueous slurry containing at least an effective amount of 2-chloroallyl diethyldithiocarbamate and an alkali lignin at a weight ratio of greater than 1:1 to 1:4 2-chloroallyl diethyldithiocarbamate to alkali lignin,
    b. acidifying said emulsion with a mineral acid to a pH between about 2 and 6, to thereby precipitate said 2-chloroallyl diethyldithiocarbamate/alkali lignin, physically absorbing the 2-chloroallyl diethyldithiocarbamate throughout the alkali lignin matrix to form a micro dispersion, and
    c. drying said precipitated materials.

2. The controlled release composite made according to the process of claim 1.

* * * * *